(No Model.) 3 Sheets—Sheet 2.
A. L. RIKER.
ELECTRIC MOTOR OR DYNAMO.
No. 604,842. Patented May 31, 1898.
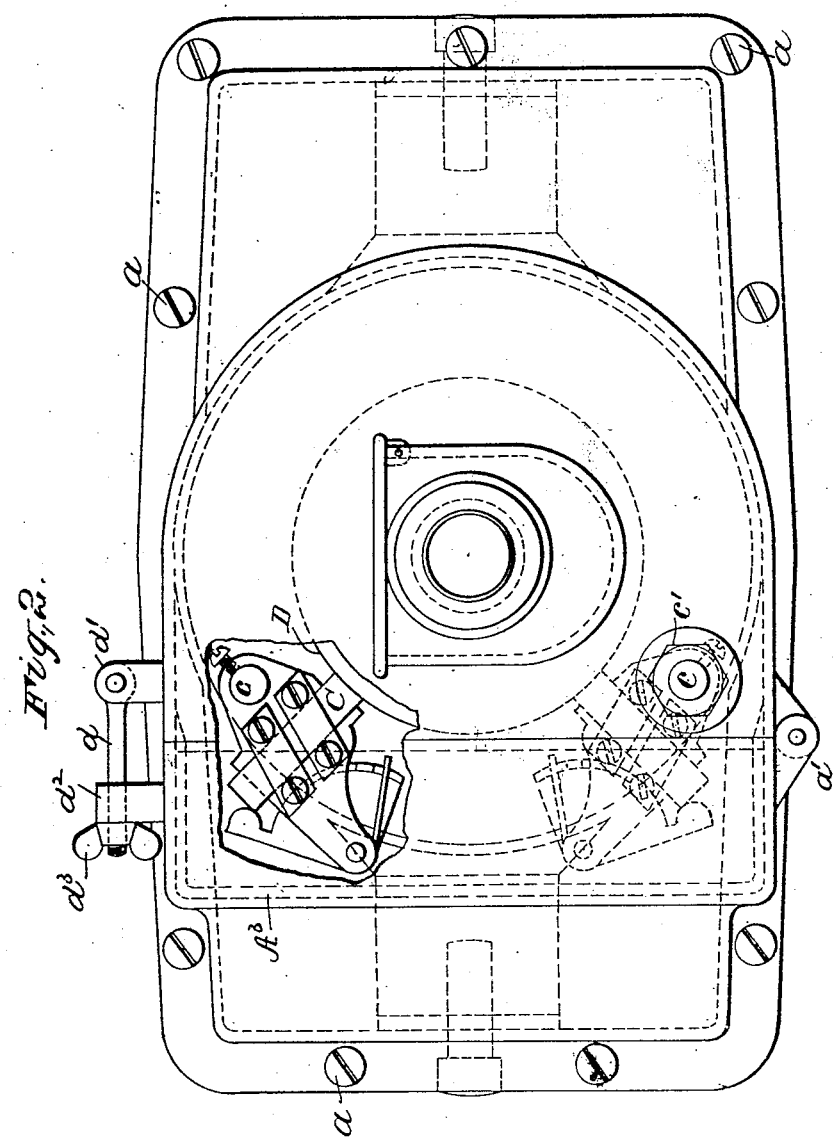
Witnesses
W. R. Edelen
Inventor
Andrew L. Riker
by Mauro
his attorneys (No Model.)  A. L. RIKER.  3 Sheets—Sheet 3.
ELECTRIC MOTOR OR DYNAMO.

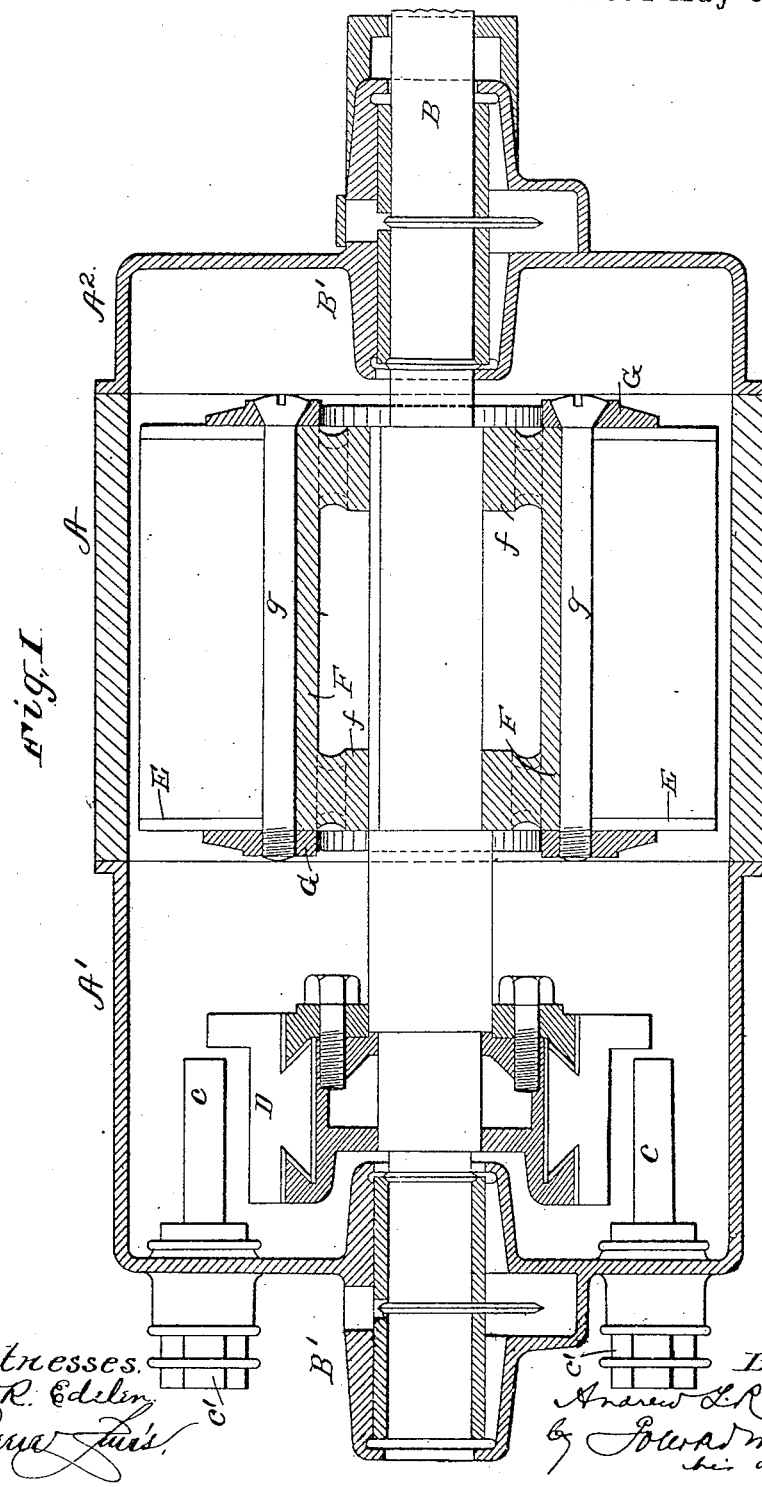

No. 604,842. Patented May 31, 1898.

Witnesses.
H. R. Edelen.

Inventor.
Andrew L. Riker
by his attorneys

UNITED STATES PATENT OFFICE.

ANDREW L. RIKER, OF NEW YORK, N. Y.

ELECTRIC MOTOR OR DYNAMO.

SPECIFICATION forming part of Letters Patent No. 604,842, dated May 31, 1898.

Application filed November 24, 1897. Serial No. 659,709. (No model.)

*To all whom it may concern:*

Be it known that I, ANDREW L. RIKER, of New York city, New York, have invented a new and useful Improvement in Electric Motors or Dynamos, which improvement is fully set forth in the following specification.

This invention relates to the construction of electric dynamos or motors, and particularly to motors used for propulsion of vehicles which are entirely inclosed in a casing, which also forms the frame of the machine.

The objects of the invention are to secure compactness of structure and facility in obtaining access to the brushes of the machine, while providing a weatherproof-casing, facility in assembling the armature, and strength and efficiency in the armature construction. The improvements whereby these objects are attained are illustrated in the accompanying drawings, in which—

Figure 4:
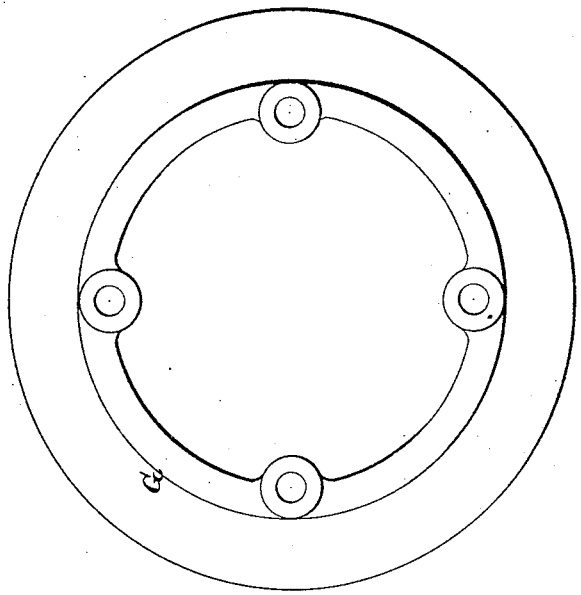
Figure 3:
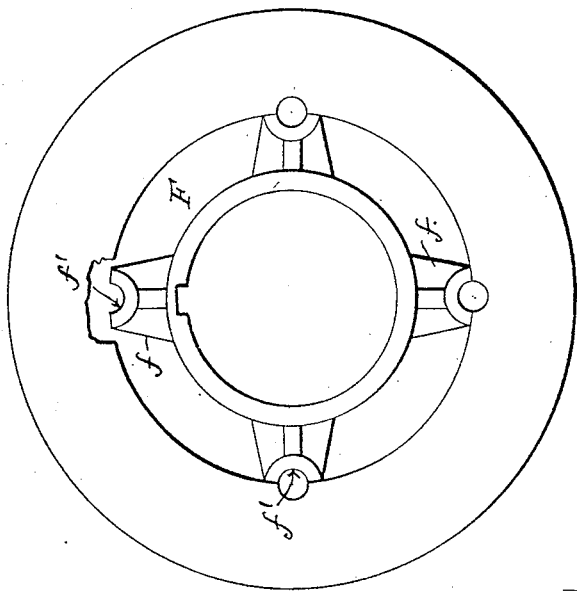

Figure 1 is a section of the motor and casing lengthwise of the armature-shaft. Fig. 2 is an elevation of one end of the machine. Fig. 3 is an end view of the armature-spider, showing also one of the soft-iron rings; and Fig. 4 is an end view of the armature-flange.

The casing or inclosing frame comprises a body $A$, in the form of a hollow casting of approximately rectangular cross-section, and end pieces or extensions $A'$ $A^2$, secured to the body $A$ by screws $a$, the whole forming a casing completely closed except for the shaft-openings.

The shaft $B$ is journaled in bearings $B'$ in the extensions $A'$ $A^2$ and is provided with oiling devices and means for preventing escape of oil, which, as they form no part of the invention, do not require particular description.

The extension $A'$ incloses the brushes $C$ and commutator $D$. The brushes are supported upon studs $c$, set in holes in the casing and secured by nuts $c'$. These brushes are arranged, as shown, one above the other near one side of the extension, which is of less width than the body $A$. At this side of the extension is a door $A^3$, hinged at $a'$ and arranged to open downwardly, and thus expose and give access to the brushes $C$. This arrangement greatly conduces to convenience in use of the motor for propulsion of vehicles and at the same time does not sacrifice compactness, which is of much importance in motors used for propulsion. It is desirable to place the motor as close as possible to the body of the vehicle, making it very inconvenient to get access to the brushes at the top of the casing. By arranging the brushes one above the other in an extension of the casing and in close proximity to a door opening downwardly or upwardly ready access can be had to the brushes without disturbing the motor or any permanent part of the vehicle.

The door $A^3$ is fastened by a bolt $d$, pivoted to an ear $d'$ on the extension and adapted to drop between projections $d^2$ on the door, the end of the bolt being threaded and provided with a wing-nut $d^3$ for tightening. Any other suitable fastening device could be used.

The armature-frame is composed of a series of soft-iron rings $E$, surrounding and supported by a cast-iron spider $F$. Heretofore in armatures of this type it has been customary generally to fasten them together by means of bolts passing through the rings, since the bolt-holes were entirely in the metal of the rings the bolts had to be insulated from the rings to avoid losses. Different means were employed to key the rings to the spider. By the present invention I avoid the necessity of insulating the bolts and utilize the latter both to fasten the different parts of the armature-frame solidly together and to key the rings to the spider. The latter is provided with four radial arms $f$, though the number may be greater or less. The outer surfaces are rounded by turning in a lathe, so that they fit snugly inside the rings $E$, as shown in Fig. 3. In the outer surface of each arm is milled a half-round groove $f'$, and opposite in the inner edge of each ring is stamped a corresponding half-round hole. The bolts $g$ thus engage both the spider and the rings, securely fastening the two together. It is found that when the bolts lie at the inner edge of the rings and not completely surrounded by the metal of the rings the losses through the bolts are inappreciable and no insulation is required. At each end of the set of rings is a holding plate or flange $G$, suitably perforated for the passage of the bolts, the perforations in one of the plates being threaded to engage the threaded ends of the bolts. This constitutes a solid structure of comparatively few parts, easily assembled and dismembered.

Having now particularly described my invention, what I claim as new, and desire to secure by Letters Patent, is—

1. The combination with the motor having its brushes arranged one above the other, of an inclosing casing having at one end an extension of less width than the body of the casing, said extension inclosing and supporting the brushes, and having a door in one side thereof to give access to the brushes, substantially as described.

2. In an armature, the combination with a spider having radial arms grooved longitudinally in their outer surfaces, rings surrounding and supported by said spider and provided in their inner edges with cuts corresponding to said grooves, and fastening-bolts surrounded partly by the rings and partly by the arms, substantially as described.

3. An armature-frame comprising in combination, a spider having radial arms grooved longitudinally in their outer surfaces, rings surrounding and supported by said spider and provided in their inner edges with cuts corresponding to said grooves, end plates or flanges provided with bolt-holes, and fastening-bolts engaging the arms and rings, substantially as described.

In testimony whereof I have signed this specification in the presence of two subscribing witnesses.

ANDREW L. RIKER.

Witnesses:
SAML. RIKER, Jr.,
JNO. M. RICHARDS.